United States Patent [19]

Shibata et al.

[11] Patent Number: 5,307,177
[45] Date of Patent: Apr. 26, 1994

[54] HIGH-EFFICIENCY CODING APPARATUS FOR COMPRESSING A DIGITAL VIDEO SIGNAL WHILE CONTROLLING THE CODING BIT RATE OF THE COMPRESSED DIGITAL DATA SO AS TO KEEP IT CONSTANT

[75] Inventors: Hideaki Shibata, Osaka; Tatsushi Bannai, Sakai, both of Japan

[73] Assignee: Matsushita Electric Industrial Co., Ltd., Osaka, Japan

[21] Appl. No.: 794,218

[22] Filed: Nov. 19, 1991

[30] Foreign Application Priority Data

Nov. 20, 1990 [JP] Japan .................. 2-317206

[51] Int. Cl.⁵ .................. H04N 1/417; H04N 1/415; H04N 7/12
[52] U.S. Cl. .................. 358/430; 358/433; 358/426; 348/415; 348/420
[58] Field of Search .................. 358/261.1, 426, 135, 358/133, 136, 430, 433, 261.2, 466

[56] References Cited

U.S. PATENT DOCUMENTS

| | | | |
|---|---|---|---|
| 4,547,811 | 10/1985 | Ochi et al. | 358/466 |
| 4,703,352 | 10/1987 | Kondo | 358/135 |
| 4,710,811 | 12/1987 | Kondo | 358/125 |
| 5,166,987 | 11/1992 | Kageyama | 358/430 |

FOREIGN PATENT DOCUMENTS 61-144989 7/1986 Japan .
63-111781 5/1988 Japan .

OTHER PUBLICATIONS

"A Study on High Efficiency Coding of HDTV Signal", Hideaki Shibata et al., the 5th Picture Coding Symposium of Japan, pp. 147-148, 1990.

Primary Examiner—Edward L. Coles, Sr.
Assistant Examiner—Scott A. Rogers
Attorney, Agent, or Firm—Wenderoth, Lind & Ponack

[57] ABSTRACT

Digital video signals are divided in blocks, maximum and minimum values of each block are extracted, and a frequency distribution of one frame period of a dynamic range in each block is detected. The coding condition is determined by the frequency distribution and a predetermined N kinds of characteristic tables, and by determining only one characteristic table, the signal obtained by subtracting the minimum value of each block from the digital video signals of each block is coded in variable length according to the dynamic range of each block. The characteristic table shows the relationship of the distortion or the number of quantization bits between the original signal and decoded signal after coding and decoding with respect to the dynamic range of digital video signal in each block, and the picture quality of decoded image is set as a parameter.

2 Claims, 8 Drawing Sheets

| 96 | 94 | 91 | 92 | 93 | 92 | 91 | 92 | 92 | 92 | 91 | 91 | 91 | 90 | 90 | 90 |
|---|---|---|---|---|---|---|---|---|---|---|---|---|---|---|---|
| 96 | 95 | 92 | 93 | 94 | 93 | 92 | 92 | 93 | 92 | 91 | 91 | 92 | 90 | 90 | 92 |
| 93 | 93 | 92 | 92 | 93 | 92 | 91 | 90 | 91 | 90 | 89 | 90 | 90 | 90 | 90 | 90 |
| 94 | 93 | 92 | 92 | 93 | 92 | 91 | 90 | 91 | 90 | 89 | 90 | 90 | 90 | 90 | 90 |
| 93 | 91 | 91 | 91 | 92 | 91 | 90 | 90 | 91 | 90 | 89 | 90 | 90 | 90 | 90 | 90 |
| 93 | 91 | 90 | 91 | 91 | 90 | 89 | 91 | 91 | 90 | 90 | 89 | 90 | 90 | 90 | 91 |
| 92 | 90 | 90 | 91 | 91 | 90 | 89 | 90 | 90 | 89 | 90 | 90 | 91 | 90 | 90 | 91 |
| 91 | 91 | 91 | 90 | 91 | 90 | 89 | 90 | 90 | 90 | 90 | 90 | 90 | 90 | 90 | 90 |
| 91 | 91 | 91 | 92 | 92 | 92 | 90 | 92 | 91 | 91 | 92 | 91 | 92 | 91 | 90 | 89 |
| 95 | 95 | 95 | 97 | 97 | 96 | 96 | 97 | 97 | 96 | 96 | 96 | 96 | 94 | 93 | 93 |
| 100 | 100 | 101 | 102 | 102 | 101 | 100 | 100 | 100 | 100 | 99 | 98 | 99 | 98 | 97 | 98 |
| 107 | 107 | 108 | 108 | 108 | 107 | 105 | 105 | 105 | 105 | 103 | 102 | 102 | 102 | 100 | 99 |
| 114 | 113 | 114 | 114 | 115 | 114 | 112 | 111 | 113 | 112 | 108 | 108 | 107 | 105 | 104 | 104 |
| 119 | 118 | 119 | 119 | 119 | 118 | 117 | 116 | 118 | 117 | 114 | 113 | 112 | 110 | 108 | 107 |
| 128 | 128 | 127 | 126 | 124 | 123 | 122 | 121 | 121 | 120 | 118 | 118 | 117 | 115 | 112 | 111 |
| 135 | 135 | 134 | 132 | 130 | 129 | 128 | 125 | 125 | 124 | 122 | 120 | 120 | 119 | 115 | 114 |

FIG. 3

| 91 | 90 | 89 | 90 |
|----|----|----|-----|
| 90 | 89 | 89 | 90 |
| 91 | 90 | 91 | 89 |
| 113 | 111 | 108 | 104 |

FIG. 4

| 5 | 4 | 4 | 2 |
|---|---|---|---|
| 3 | 3 | 2 | 1 |
| 17 | 18 | 14 | 13 |
| 22 | 19 | 17 | 16 |

FIG. 6

| DYNAMIC RANGE | FREQUENCY |
|---------------|-----------|
| 1 | 1 |
| 2 | 2 |
| 3 | 2 |
| 4 | 2 |
| 5 | 1 |
| 13 | 1 |
| 14 | 1 |
| 16 | 1 |
| 17 | 2 |
| 18 | 1 |
| 19 | 1 |
| 22 | 1 |

FIG. 5

| 5 | 3 | 0 | 1 | 3 | 2 | 1 | 2 | 3 | 3 | 2 | 2 | 1 | 0 | 0 | 0 |
|---|---|---|---|---|---|---|---|---|---|---|---|---|---|---|---|
| 5 | 4 | 1 | 2 | 4 | 3 | 2 | 2 | 4 | 3 | 2 | 2 | 2 | 0 | 0 | 2 |
| 2 | 2 | 1 | 1 | 3 | 2 | 1 | 0 | 2 | 1 | 0 | 1 | 0 | 0 | 0 | 0 |
| 3 | 2 | 1 | 1 | 3 | 2 | 1 | 0 | 2 | 1 | 0 | 1 | 0 | 0 | 0 | 0 |
| 3 | 1 | 1 | 1 | 3 | 2 | 1 | 1 | 2 | 1 | 0 | 1 | 0 | 0 | 0 | 0 |
| 3 | 1 | 0 | 1 | 2 | 1 | 0 | 2 | 2 | 1 | 1 | 0 | 0 | 0 | 0 | 1 |
| 2 | 0 | 0 | 1 | 2 | 1 | 0 | 1 | 1 | 0 | 1 | 1 | 1 | 0 | 0 | 1 |
| 1 | 1 | 1 | 0 | 2 | 1 | 0 | 1 | 1 | 1 | 1 | 1 | 0 | 0 | 0 | 0 |
| 0 | 0 | 0 | 1 | 2 | 2 | 0 | 2 | 0 | 0 | 1 | 0 | 3 | 2 | 1 | 0 |
| 4 | 4 | 4 | 6 | 7 | 6 | 6 | 7 | 6 | 5 | 5 | 5 | 7 | 5 | 4 | 4 |
| 9 | 9 | 10 | 11 | 12 | 11 | 10 | 10 | 9 | 9 | 8 | 7 | 10 | 9 | 8 | 9 |
| 16 | 16 | 17 | 17 | 18 | 17 | 15 | 15 | 14 | 14 | 12 | 11 | 13 | 13 | 11 | 10 |
| 1 | 0 | 1 | 1 | 4 | 3 | 1 | 0 | 5 | 4 | 0 | 0 | 3 | 1 | 0 | 0 |
| 6 | 5 | 6 | 6 | 8 | 7 | 6 | 5 | 10 | 9 | 6 | 5 | 8 | 6 | 4 | 3 |
| 15 | 15 | 14 | 13 | 13 | 12 | 11 | 10 | 13 | 12 | 10 | 10 | 13 | 11 | 8 | 7 |
| 22 | 22 | 21 | 19 | 19 | 18 | 17 | 14 | 17 | 16 | 14 | 12 | 16 | 15 | 11 | 10 |

| DYNAMIC RANGE | QUANTIZATION BIT NUMBER |
|---|---|
| 0 | 0 |
| 1 | 1 |
| 2 ~ 3 | 2 |
| 4 ~ 7 | 3 |
| 8 ~ 9 | 4 |
| 10 ~ 62 | 3 |
| 63 ~ 73 | 4 |
| 74 ~ 76 | 3 |
| 77 ~ 194 | 4 |
| 195 ~ 208 | 5 |
| 209 ~ 224 | 4 |
| 225 ~ 255 | 5 |

FIG. 10

| 7 | 4 | 0 | 1 | 5 | 4 | 2 | 4 | 5 | 5 | 4 | 4 | 2 | 0 | 0 | 0 |
|---|---|---|---|---|---|---|---|---|---|---|---|---|---|---|---|
| 7 | 6 | 1 | 3 | 7 | 5 | 4 | 4 | 7 | 5 | 4 | 4 | 3 | 0 | 0 | 3 |
| 3 | 3 | 1 | 1 | 5 | 4 | 2 | 0 | 4 | 2 | 0 | 2 | 0 | 0 | 0 | 0 |
| 4 | 3 | 1 | 1 | 5 | 4 | 2 | 0 | 4 | 2 | 0 | 2 | 0 | 0 | 0 | 0 |
| 3 | 1 | 1 | 1 | 3 | 2 | 1 | 1 | 3 | 2 | 0 | 2 | 0 | 0 | 0 | 0 |
| 3 | 1 | 0 | 1 | 2 | 1 | 0 | 2 | 3 | 2 | 2 | 0 | 0 | 0 | 0 | 1 |
| 2 | 0 | 0 | 1 | 2 | 1 | 0 | 1 | 2 | 0 | 2 | 2 | 1 | 0 | 0 | 1 |
| 1 | 1 | 1 | 0 | 2 | 1 | 0 | 1 | 2 | 2 | 2 | 2 | 0 | 0 | 0 | 0 |
| 0 | 0 | 0 | 0 | 1 | 1 | 0 | 1 | 0 | 0 | 1 | 0 | 2 | 1 | 1 | 0 |
| 2 | 2 | 2 | 3 | 3 | 2 | 2 | 3 | 3 | 3 | 3 | 3 | 4 | 3 | 2 | 2 |
| 4 | 4 | 4 | 5 | 5 | 4 | 4 | 4 | 5 | 5 | 4 | 4 | 5 | 5 | 4 | 5 |
| 7 | 7 | 7 | 7 | 7 | 7 | 6 | 6 | 7 | 7 | 6 | 6 | 7 | 7 | 6 | 5 |
| 0 | 0 | 0 | 0 | 2 | 1 | 0 | 0 | 2 | 2 | 0 | 0 | 1 | 0 | 0 | 0 |
| 2 | 2 | 2 | 2 | 3 | 3 | 2 | 2 | 4 | 4 | 3 | 2 | 4 | 3 | 2 | 1 |
| 5 | 5 | 5 | 4 | 5 | 4 | 4 | 4 | 5 | 5 | 4 | 4 | 6 | 5 | 4 | 3 |
| 7 | 7 | 7 | 6 | 7 | 7 | 6 | 5 | 7 | 7 | 6 | 5 | 7 | 7 | 5 | 4 |

HIGH-EFFICIENCY CODING APPARATUS FOR COMPRESSING A DIGITAL VIDEO SIGNAL WHILE CONTROLLING THE CODING BIT RATE OF THE COMPRESSED DIGITAL DATA SO AS TO KEEP IT CONSTANT

BACKGROUND OF THE INVENTION

1. Field of the Invention

The present invention relates to an apparatus for high-efficiency coding for compressing a digital video signal at a high efficiency, and more particularly to an apparatus for high-efficiency coding of a digital video signal which controls the coding bit rate of the compressed digital data so as to keep it constant.

2. Description of the Prior Art

As an apparatus for the high-efficiency coding of a digital video signal, the Japanese Laid-open Patent No. 61-144989 discloses an apparatus for determining the dynamic range defined by the maximum and minimum values of plural pixels contained in a two-dimensional block, and coding at a variable bit length corresponding to this dynamic range. Japanese Laid-open Patent No. 63-111781 discloses a constant rate instead of a variable length coding, and an apparatus for high-efficiency coding was proposed for detecting the occurrence frequency of dynamic ranges in a specific period, sequentially integrating the frequency of the adjacent dynamic ranges by starting from the maximum value or minimum value to form an integration table of the occurrence frequency, and controlling the quantity of coded digital data using the integration table.

In the composition of controlling the quantity of coded digital data by using the integration table of the occurrence frequency as mentioned above, however, the number of quantization bits assigned for each dynamic range will merely increase monotonously with an increase of the dynamic range. In this simple method of assigning the number of quantization bits, when the dynamic range becomes larger, the distortion occurring between the signal decoded from the coded digital data and the original signal (hereinafter called distortion by coding) becomes extremely large at certain dynamic ranges. On the other hand, as the characteristics of human visual sensation, the characteristics of limit of impairment perception were reported, using the level deviation within a minute subpicture block of an image, or the dynamic range, as the parameter (see the 5th Picture Coding Symposium of Japan; A study on high-efficiency coding of HDTV signal, Shibata et al., pp. 147-148), and the above phenomenon does not match with human visual sensation, and may cause a loss in the picture quality.

SUMMARY OF THE INVENTION

The present invention determines only one of plural kinds of characteristic tables each showing a relationship between the dynamic range and distortion by coding images which are visually equivalent in loss of picture quality over all values of the dynamic range of each block, and sets the number of quantization bits to be assigned to the dynamic range of each block. Accordingly, the number of quantization bits to be assigned for each dynamic range does not increase monotonously with an increase of in the dynamic range, and the distortion by coding over all of the values of the dynamic range does not surpass only one determined characteristic table, that is, the visual sensation equivalent in the loss of picture quality visually.

It is hence a primary object of the present invention is to present an apparatus for a high-efficiency coding capable of controlling the coding bit rate corresponding to the human visual sensation characteristics.

The coding apparatus of the present invention comprises:

an apparatus for high-efficiency coding of a digital video image, comprising:

a means for dividing a digital video signal into a plurality of blocks each composed of a plurality of pixel values;

a means for extracting a minimum value and a maximum value of the pixel values in each of the plurality of blocks;

a means for subtracting the minimum value from each of the pixel values in each block to obtain difference values;

a means for calculating a dynamic range of each block from the maximum and minimum values;

a first memory means for storing the difference values of each block;

a second memory means for storing the dynamic range of each block;

a third memory means for storing the minimum value of each block;

a means for detecting a frequency distribution of dynamic ranges of the plurality of blocks;

a means having N kinds of first characteristic tables each having as a parameter a decoded image quality visually observed which are equal in loss of picture quality and showing a relationship between the dynamic range and distortion caused by encoding, and a second characteristic table having a quantization width as a parameter and showing a relationship between the dynamic range and the distortion caused by encoding;

a means for calculating a total amount of coded data from the detected frequency distribution of dynamic ranges and quantization widths determined by a combination of each of the N kinds of first characteristic tables and the second characteristic table to obtain N kinds of total amount values corresponding to the N kinds of characteristic tables, respectively, and for comparing each of the N kinds of total amount values with a predetermined value, and for selecting one of the N kinds of total amount values which is smaller than the predetermined value and closest to the predetermined value, and outputting a table number indicating one of the N kinds of first characteristic tables which gives the selected total amount value;

a means for encoding the difference values of each block stored in the first memory means by using the dynamic range stored in the second memory and the quantization widths determined by a combination of the selected first characteristic table indicated by the table number and the second characteristic table to obtain coded data; and a means for outputting the minimum value stored in the third memory, the dynamic range stored in the second memory and the coded data together with the table number.

The coding apparatus may also comprise: an apparatus for high-efficiency coding of a digital video image, comprising:

a means for dividing a digital video signal in each frame into a plurality of blocks each composed of a plurality of pixel values;

a means for extracting a minimum value and a maximum value of the pixel values in each of the plurality of blocks;

a means for subtracting the minimum value from each of the pixel values in each block to obtain difference values;

a means for calculating a dynamic range of each block from the maximum and minimum values;

a first memory means for storing the difference values of each block;

a second memory means for storing the dynamic range of each block;

a third memory means for storing the minimum value of each block;

a means for detecting a frequency distribution of dynamic ranges in a frame;

means having N kinds of first characteristic tables each having as a parameter a decoded image quality visually observed which are equal in loss of picture quality and showing a relationship between the dynamic range and distortion caused by encoding, and a second characteristic table having a quantization width as a parameter and showing a relationship between the dynamic range and the distortion caused by encoding;

a means for calculating a total amount of coded data from the detected frequency distribution of dynamic ranges and quantization widths determined by a combination of each of the N kinds of first characteristic tables and the second characteristic table to obtain N kinds of total amount values corresponding to the N kinds of characteristic tables, respectively, and for comparing each of the N kinds of total amount values with a predetermined value, and for selecting one of the N kinds of total amount values which is smaller than the predetermined value and closest to the predetermined value, and outputting a table number indicating one of the N kinds of first characteristic tables which gives the selected total amount value;

a means for encoding the difference values of each block stored in the first memory means by using the dynamic range stored in the second memory and the quantization widths determined by a combination of the selected first characteristic table indicated by the table number and the second characteristic table to obtain coded data; and a means for outputting the minimum value stored in the third memory, the dynamic range stored in the second memory and the coded data together with the table number.

DESCRIPTION OF THE PREFERRED EMBODIMENTS

Figure 1:
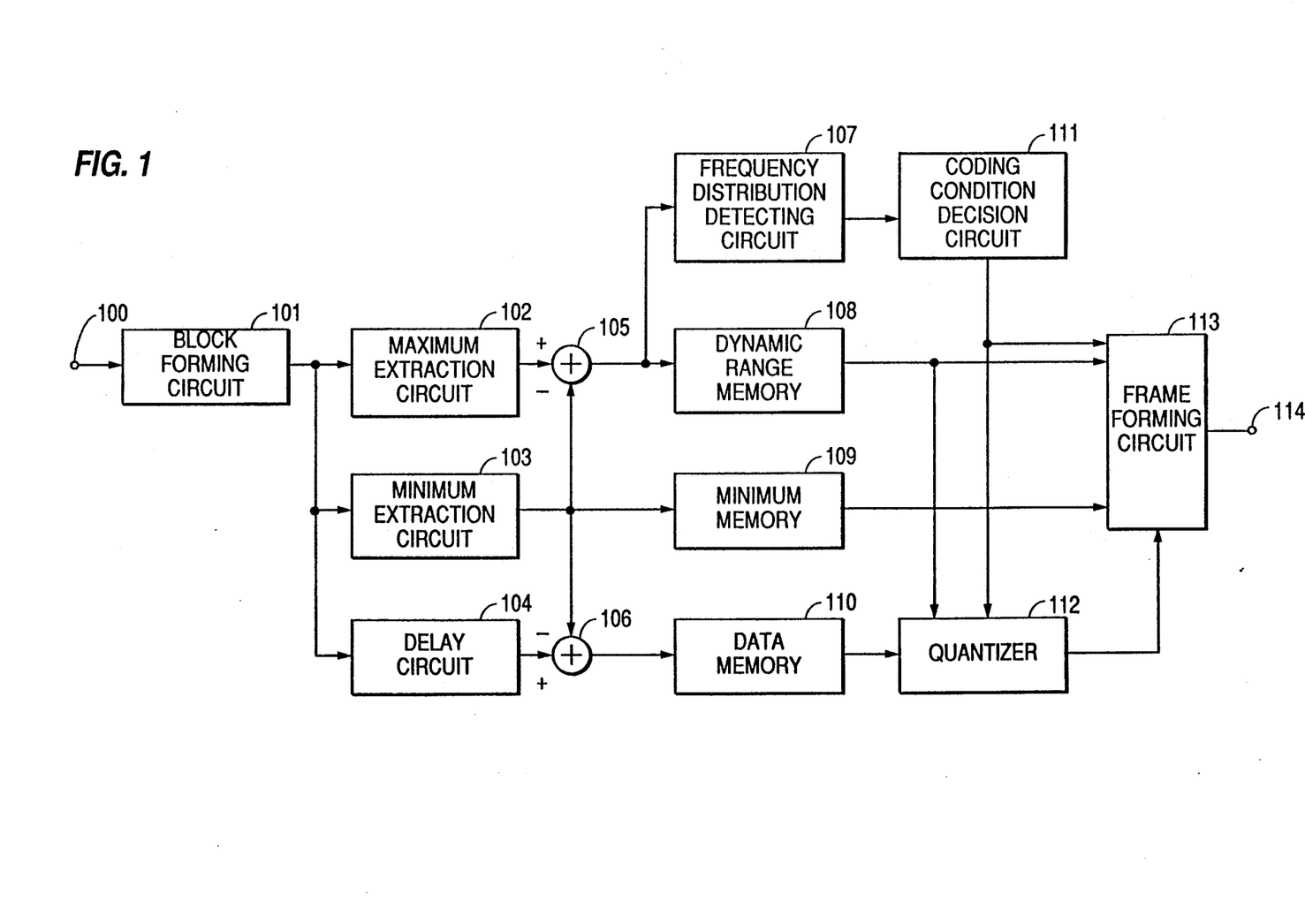
FIG. 1 is a block diagram of an apparatus for high-efficiency coding of digital video signal in accordance with a preferred embodiment of the present invention.

FIG. 1 is a block diagram of an apparatus for the high-efficiency coding of a digital video signal in accordance with a preferred embodiment of the invention. In this embodiment, the digital video signal is quantized into 8 bits, and the two-dimensional digital video signal is divided into minute subpicture blocks composed of $4 \times 4$ pixels, and the coding bit rate is controlled in one frame period.

In FIG. 1, element 101 is a block forming circuit for dividing digital video signals in one frame periods into minute subpicture blocks of $4 \times 4$ pixels. This circuit may be composed of a random access memory (RAM). Element 102 is a maximum extraction circuit for extracting the maximum value of each block; element 103 is a minimum extraction circuit for extracting the minimum value of each block; element 104 is a delay circuit for delaying the block-formed digital video signal by the time required for signal processing of the minimum extraction circuit 103; element 105 is a subtractor for calculating the dynamic range from the maximum and minimum values of each block, and element 106 is a subtractor for subtracting the minimum value of that block from the values of all of the pixels in each block. Element 107 is a frequency distribution detecting circuit for detecting the frequency distribution of blocks possessing each dynamic range in one frame period. This circuit 107 may be composed of a RAM and an adder. Element 108 is a dynamic range memory for storing the dynamic range of each block; element 109 is a minimum memory for storing the minimum value of each block; and element 110 is a data memory for storing the digital data from which the minimum value has been subtracted in each block. Numeral 111 is a coding condition decision circuit for delivering the table number of the table indicating the relationship between the dynamic range and the number of quantization bits of each block from only the information of the frequency distribution of the dynamic range in one frame period, and element 112 is a quantizer. The decision circuit 111 may be composed of a read-only memory (ROM) addressed with the digital data after subtracting the minimum value of each block, the dynamic range of that block, and the table number determined in the coding condition decision circuit 111. Element 113 is a frame forming circuit, which sums up the dynamic range of each block, the minimum data, and the coded data of all pixels in the block, adds the table number determined as the coding condition, and delivers the digital data for one frame period.

Figure 2:
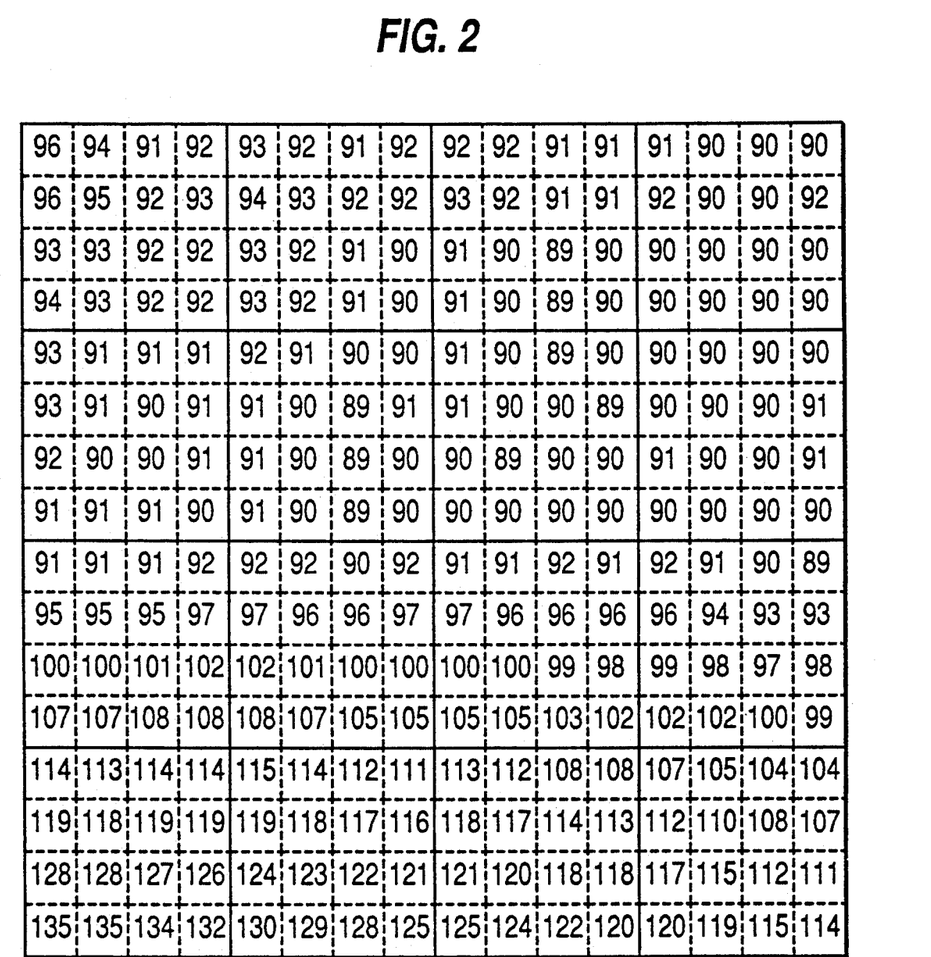
FIG. 2 is a diagram showing an example of a digital video signal of one frame period.

First of all, digital video signals for one frame period are fed in the input terminal 100. For the sake of simplicity of explanation, the digital video signals of one frame period are assumed to be composed of 16 pixels each in the horizontal and vertical direction as shown in FIG. 2. One frame, in which a numeral is written, in FIG. 2 corresponds to one pixel, and the numerals indicate the levels quantized in 8 bits. The input digital video signal is divided into minute subpicture blocks composed of 4×4 pixels in the block forming circuit 101. The mode of block division is shown by solid lines in FIG. 2. The block forming circuit 101 delivers the digital video signal to the maximum extraction circuit 102, minimum extraction circuit 103, and delay circuit 104.

Figure 3:
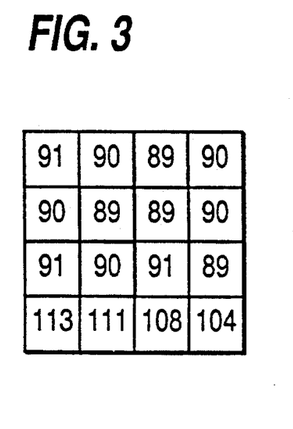
FIG. 3 is a diagram showing the minimum value of each block in FIG. 2.
Figure 4:
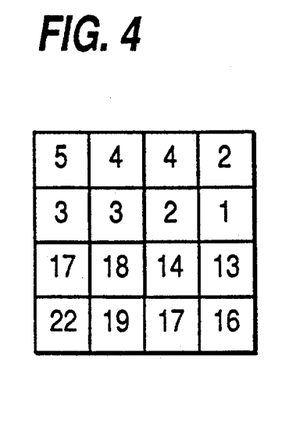
FIG. 4 is a diagram showing the dynamic range of each block in FIG. 2.
Figure 5:
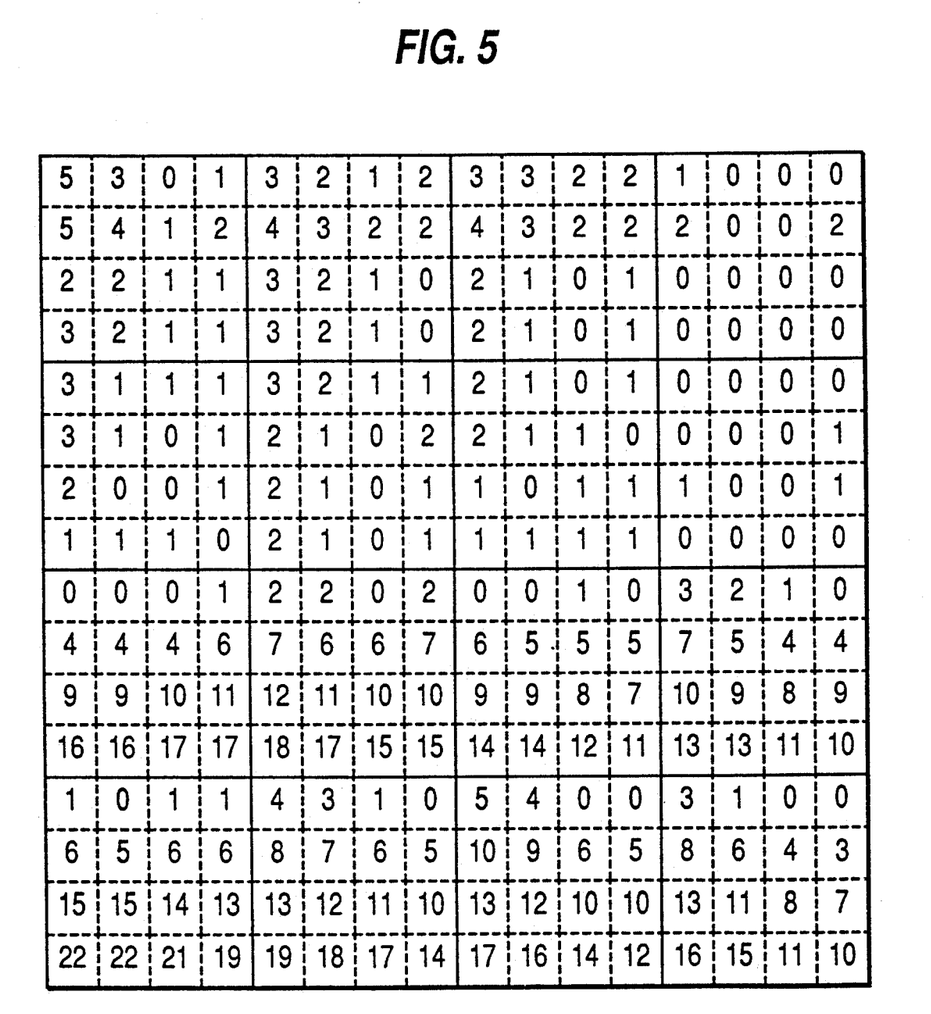
FIG. 5 is a diagram showing a signal after subtracting the minimum value in each block of the digital video signal in FIG. 2.

The maximum extraction circuit 102 compares the levels of all pixels in one block, and extracts the maximum value in each block. Similarly, the minimum extraction circuit 103 extracts the minimum value of each block. The minimum value of each block in FIG. 2 is shown in FIG. 3. From the extracted maximum and minimum values, the dynamic range of each block is calculated in the substractor 105. FIG. 4 shows the dynamic range of each block in FIG. 2. The calculated dynamic range is delivered to the frequency distribution detecting circuit 107 and dynamic range memory 108. The extracted minimum value is stored in the minimum memory 109, and is also delivered to the subtractor 106. In the subtractor 106, the minimum value of the corresponding block is subtracted from the values of all pixels in each block of the digital video signal divided in blocks. The result is shown in FIG. 5. This result is stored in the data memory 110.

Figure 6:
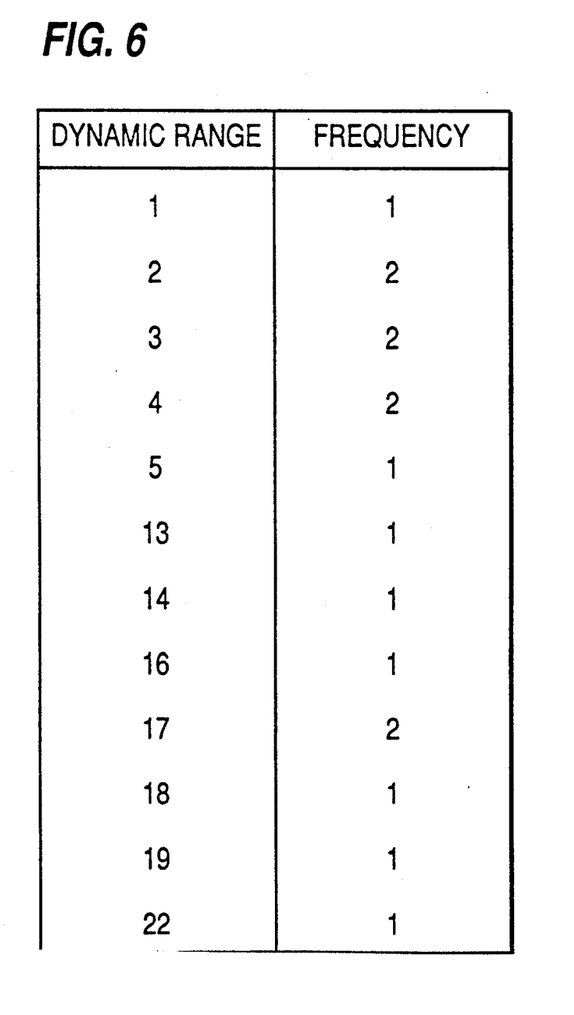
FIG. 6 is a diagram showing the frequency distribution of the block having each dynamic range.

In the frequency distribution detecting circuit 107, the frequency distribution of the dynamic range in each block of one frame period is detected. An example of the frequency distribution is shown in FIG. 6. The frequency distribution of the dynamic range is delivered to the coding condition decision circuit 111.

Figure 7:
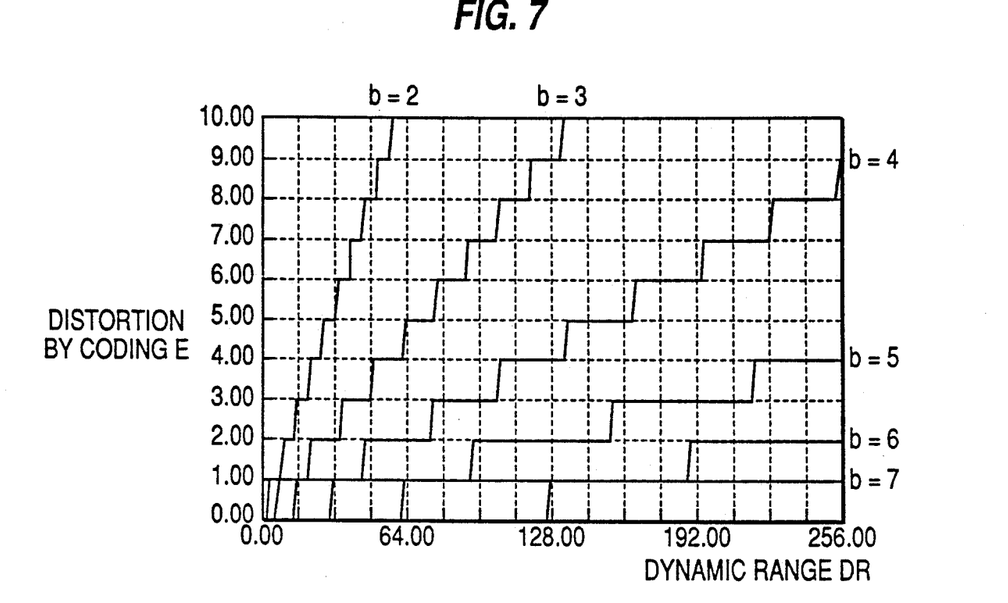
FIG. 7 is a diagram showing a relationship between the distortion by coding and the dynamic range of each block when the number of quantization bits is changed from 2 to 7.
Figure 8:
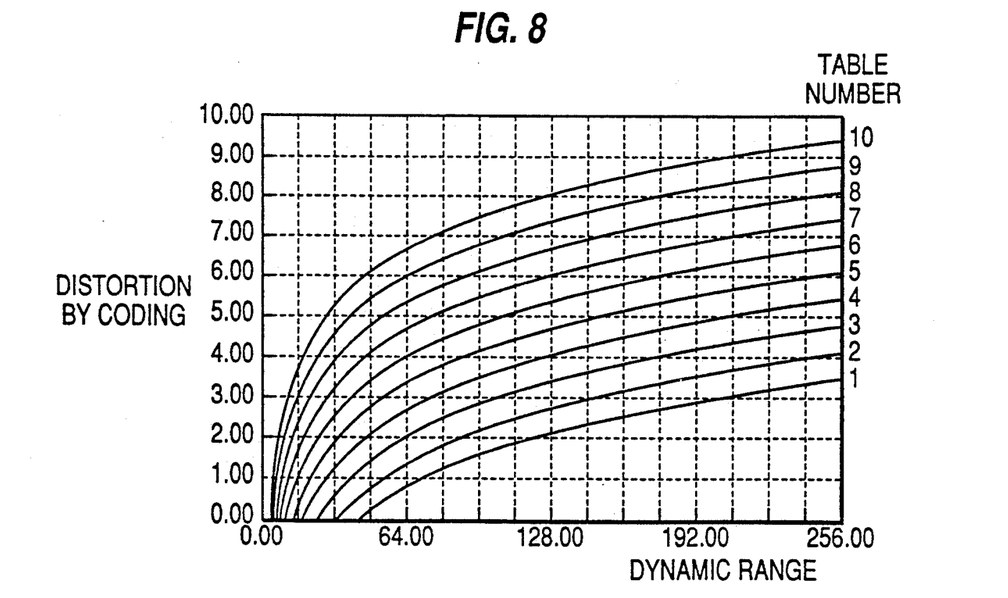
FIG. 8 is a diagram showing a relationship between the distortion by coding and the dynamic range of each block with parameters of 10 kinds of picture qualities of decoded image.

The coding condition decision circuit 111 possesses the table of distortion caused by coding corresponding to each dynamic range when the digital data are coded in a constant number of quantization bits regardless of the dynamic range from 0 bit to 8 bits, and the table of visual sensation characteristics of distortion by coding images which are visually equivalent in loss of picture quality over all values of the dynamic range of each block. FIG. 7 shows an example of the former table in which the number of quantization bits is the parameter, and FIG. 8 shows an example of the latter table in which the picture quality of the decoded image is the parameter. The numerals given in FIG. 8 as the table numbers are given in the sequence of the better picture quality of decoded image. If the distortion after decoding is E, and the dynamic range is DR, and the number of quantization bits is b, then each table in FIG. 7 may be expressed as $E + \text{int}[DR/(2^{b+1}-2)+0.5]$, where int [] denotes omission processing. In the coding condition decision circuit 111, processing is done in the ascending sequence of table numbers by using the frequency distribution of the dynamic range. Therefore, in the first place, the characteristic of the table of table number 1 shown in FIG. 8, that is, the characteristic of the best picture quality of decoded image is selected, and the number of quantization bits assigned to each dynamic range satisfying this characteristic is determined by the former table. The number of quantization bits assigned in each dynamic range and the frequency distribution of dynamic range are integrated and summed up, and the quantity of coded digital data is determined by the summation calculation. When the quantity of coded digital data becomes smaller than the target for the first time, the table number is determined, which is delivered to the quantizer 112 and frame forming circuit 113.

Figure 9:
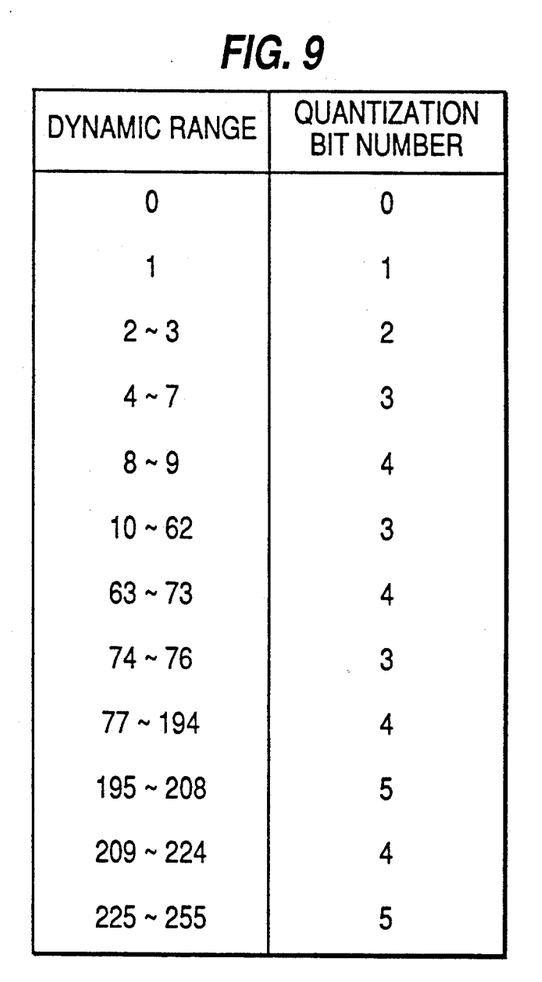
FIG. 9 is a diagram showing a relationship between the dynamic range of each block and the number of quantization bits assigned to the dynamic range of each block for realizing the characteristic of table number 7 in FIG. 8.
Figure 10:
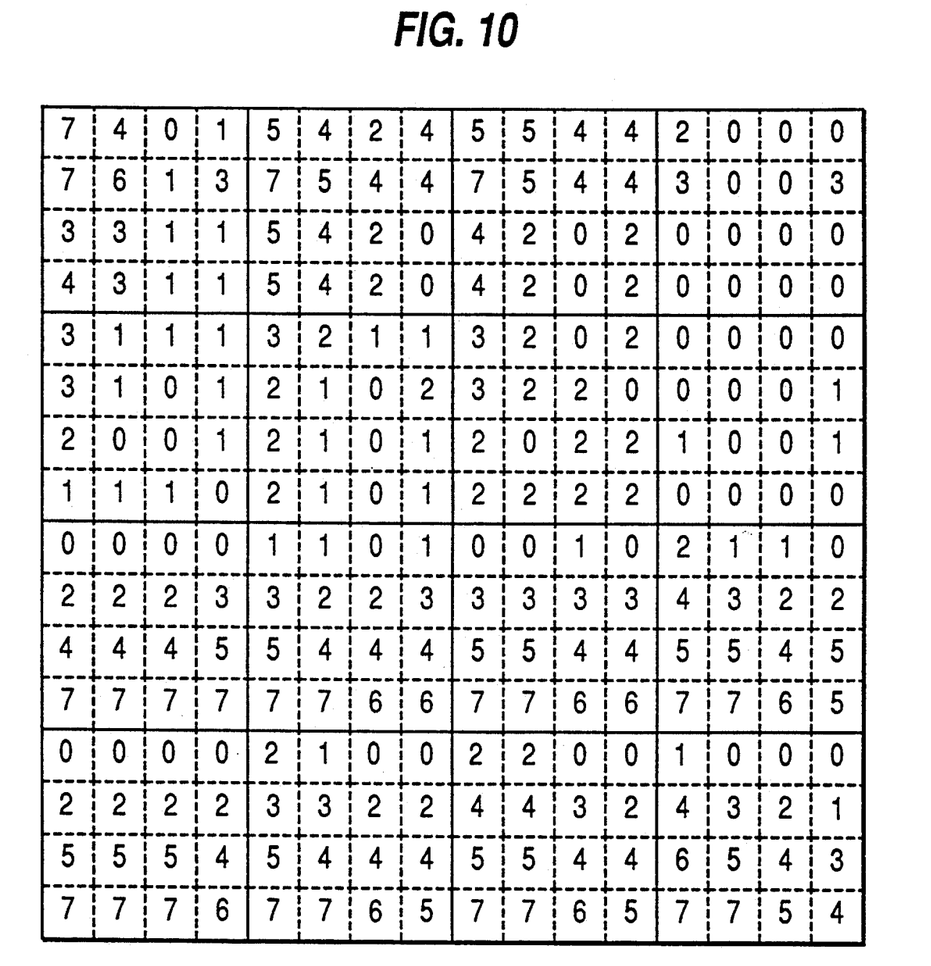
FIG. 10 is a diagram showing the result of quantizing the digital data in FIG. 5 according to FIG. 9.

The quantizer 112 possesses two tables shown in FIG. 7 and FIG. 8 owned by the coding condition decision circuit 111. From the table number determined in the coding condition decision circuit 111 and the dynamic range in each block from the dynamic range memory 108, the number of quantization bits assigned to each block is determined, and the digital data in each block from the data memory 110 is quantized in that number of quantization bits. The quantized digital data is delivered to the frame forming circuit 113. For example, when the table number 7 given to the characteristic in FIG. 8 is delivered from the coding condition decision circuit 111, the number of quantization bits assigned to the dynamic range of each block becomes as shown in FIG. 9. The digital data in FIG. 5 is quantized according to FIG. 9. The result is shown in FIG. 10.

Figure 11:
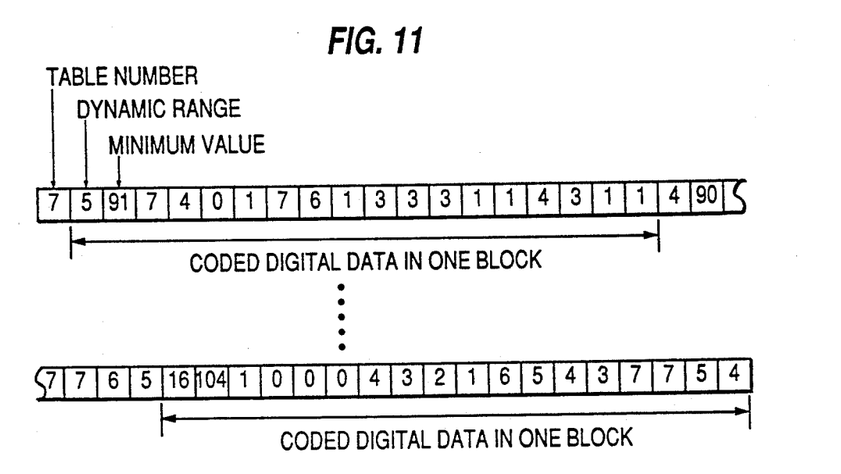
FIG. 11 is a diagram showing a coded digital data row of one frame period.

In the frame forming circuit 113, a digital data row for one frame period is formed. For example, at the beginning of one frame period, the output from the coding condition decision circuit 111 is formed, which is followed by the outputs from the dynamic range memory 108, minimum memory 109 and quantizer 112 in each block in assembly, and they are delivered to the output terminal 114. FIG. 11 shows an example of the coded digital data row. The distortion caused by coding corresponding to each dynamic range after decoding the coded digital data row is shown in FIG. 12 in comparison with the predetermined picture quality of decoded image, that is, the characteristic of the table of table number 7.

Figure 12:
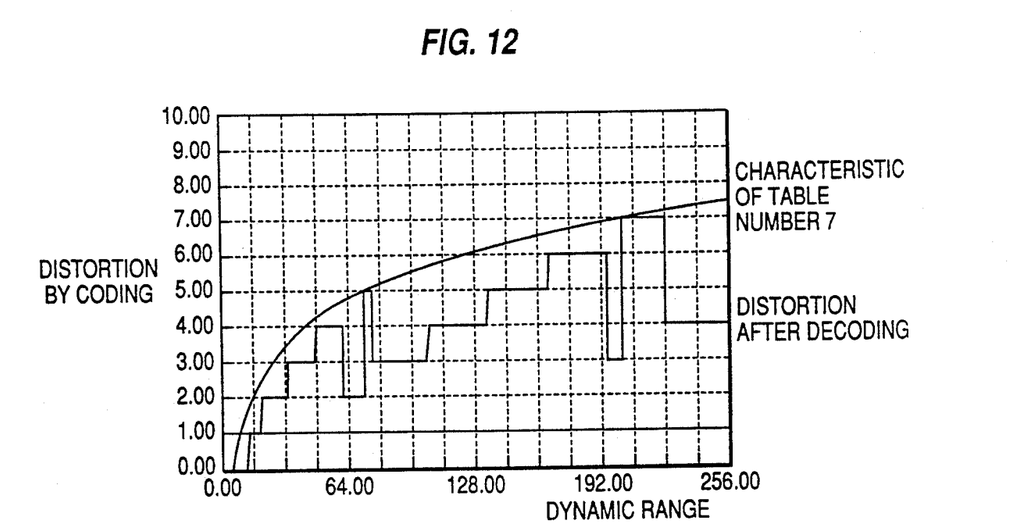
FIG. 12 is a diagram showing the characteristic of table number 7 in FIG. 8 in comparison with the characteristic of distortion after decoding the digital data row in FIG. 11.

In this embodiment, as explained herein, since the coding condition to the coding bit rate is determined by the predetermined table number, that is, the distortion by coding corresponding to the dynamic range with the picture quality of decoded image as the parameter, the number of quantization bits assigned for each dynamic range does not increase montonical with the increase of the dynamic range, and the distortion caused by coding does not become larger than the characteristic predetermined as shown in FIG. 12, so that the coding bit rate corresponding to the visual sensation characteristics can be controlled.

In the embodiment, the digital video signal of one frame period is quantized in 8 bits, it is divided in minute subpicture blocks 4×4 pixels, and the coding bit rate is controlled in each frame, but the number of quantization bits of digital video signal and the number of block divisions are not limited, and the control unit of the coding bit rate may be also the block unit, field unit, or unit of plural frames.

What is claimed is:

1. An apparatus for high-efficiency coding of a digital video image, comprising:
   a means for dividing a digital video signal into a plurality of blocks each composed of a plurality of pixel values;
   a means for extracting a minimum value and a maximum value of the pixel values in each of the plurality of blocks;

a means for subtracting the minimum value from each of the pixel values in each block to obtain difference values;

a means for calculating a dynamic range of each block from the maximum and minimum values;

a first memory means for storing the difference values of each block;

a second memory means for storing the dynamic range of each block;

a third memory means for storing the minimum value of each block;

a means for detecting a frequency distribution of dynamic ranges of the plurality of blocks;

a means having N kinds of first characteristic tables each having as a parameter a decoded image quality visually observed which are equal in loss of picture quality and showing a relationship between the dynamic range and distortion caused by encoding, and a second characteristic table having a quantization width as a parameter and showing a relationship between the dynamic range and distortion caused by encoding;

a means for calculating a total amount of coded data from the detected frequency distribution of dynamic ranges and quantization widths determined by a combination of each of the N kinds of first characteristic tables and the second characteristic table to obtain N kinds of total amount values corresponding to the N kinds of characteristic tables, respectively, and for comparing each of the N kinds of total amount values with a predetermined value, and for selecting one of the N kinds of total amount values which is smaller than the predetermined value and closest to the predetermined value, and outputting a table number indicating one of the N kinds of first characteristic tables which gives the selected total amount value;

a means for encoding the difference values of each block stored in the first memory means by using the dynamic range stored in the second memory and the quantization widths determined by a combination of the selected first characteristic table indicated by the table number and the second characteristic table to obtain coded data; and a means for outputting the minimum value stored in the third memory, the dynamic range stored in the second memory and the coded data together with the table number.

2. An apparatus for high-efficiency coding of a digital video image, comprising:

a means for dividing a digital video signal in each frame into a plurality of blocks each composed of a plurality of pixel values;

a means for extracting a minimum value and a maximum value of the pixel values in each of the plurality of blocks;

a means for subtracting the minimum value from each of the pixel values in each block to obtain difference values;

a means for calculating a dynamic range of each block from the maximum and minimum values;

a first memory means for storing the difference values of each block;

a second memory means for storing the dynamic range of each block;

a third memory means for storing the minimum value of each block;

a means for detecting a frequency distribution of dynamic ranges in a frame;

means having N kinds of first characteristic tables each having as a parameter a decoded image quality visually observed which are equal in loss of picture quality and showing a relationship between the dynamic range and distortion caused by encoding, and a second characteristic table having a quantization width as a parameter and showing a relationship between the dynamic range and the distortion caused by encoding;

a means for calculating a total amount of coded data from the detected frequency distribution of dynamic ranges and quantization widths determined by a combination of each of the N kinds of first characteristic tables and the second characteristic table to obtain N kinds of total amount values corresponding to the N kinds of characteristic tables, respectively, and for comparing each of the N kinds of total amount values with a predetermined value, and for selecting one of the N kinds of total amount values which is smaller than the predetermined value and closest to the predetermined value, and outputting a table number indicating one of the N kinds of first characteristic tables which gives the selected total amount value;

a means for encoding the difference values of each block stored in the first memory means by using the dynamic range stored in the second memory and the quantization widths determined by a combination of the selected first characteristic table indicated by the table number and the second characteristic table to obtain coded data; and a means for outputting the minimum value stored in the third memory, the dynamic range stored in the second memory and the coded data together with the table number.

* * * * *